United States Patent [19]

Suh et al.

[11] Patent Number: 5,710,774
[45] Date of Patent: Jan. 20, 1998

[54] FRAME SYNCHRONIZING DEVICE

[75] Inventors: Chung-Wook Suh; Seong-Do Kim, both of Daejeon, Rep. of Korea

[73] Assignees: Electronics and Telecommunications Research Institute, Daejeon-shi, Rep. of Korea; Korea Telecommunication Authority, Seoul, Rep. of Korea

[21] Appl. No.: 555,852

[22] Filed: Nov. 13, 1995

[30] Foreign Application Priority Data

Dec. 9, 1994 [KR] Rep. of Korea ............... 94-33484

[51] Int. Cl.$^6$ ............................................... H04L 7/08
[52] U.S. Cl. ............................ 370/513; 370/514; 375/368
[58] Field of Search ................................ 370/513, 514, 370/503, 509, 511, 512; 375/365, 366, 368

[56] References Cited

U.S. PATENT DOCUMENTS

| | | | |
|---|---|---|---|
| 4,748,623 | 5/1988 | Fujimoto | 370/514 |
| 4,920,535 | 4/1990 | Watanabe et al. | 370/514 |
| 5,081,654 | 1/1992 | Stephenson, Jr. et al. | 370/512 |
| 5,132,991 | 7/1992 | McNesby et al. | 370/513 |
| 5,136,587 | 8/1992 | Obana et al. | 370/514 |
| 5,313,500 | 5/1994 | Rikiyama | 370/514 |

OTHER PUBLICATIONS

Choi, DooWhan: "Frame Alignment In a Digital Carrier System –A Tutorial", Feb. 1990, pp. 47–54; IEEE Communicat6ions Magazine.

Xiaokanhg, et al.: "A New Design of the STM–1 Frame Aligner"; 1993, ICC. pp. 11.02.1–11.02.4.

Primary Examiner—Chau Nguyen
Attorney, Agent, or Firm—Jacobson, Price, Holman & Stern, PLLC

[57] ABSTRACT

A frame synchronizing device for discriminating a time slot location for each channel of time-division multiplexed signals is disclosed. The frame synchronizing device according to the invention processes time-division multiplexed signals in parallel in a STM-4C(Synchronous Transport Module-4 Concatenation) of the Broadband Integrated Service Digital Network according to the ITU-T recommendation, such that the searching of frame synchronization can be achieved by detecting frame bytes on data being received at a high speed in the STM-4C structure to align the bytes based on the detected time interval, converting the frame data into the 8-bits parallel data and then detecting, in sequence, the frame bytes at a lower speed clock being divided by 8, thereby providing a simplified, less power consumptive frame synchronizing device in the STM-4C structure according to the ITU-T recommendation.

18 Claims, 4 Drawing Sheets

FRAME SYNCHRONIZING DEVICE

FIELD OF THE INVENTION

The present invention relates to a frame synchronizing device for discriminating a time slot location for each channel of time-division multiplexed signals, and more particularly, to a frame synchronizing device for processing time-division multiplexed signals in parallel in a STM-4C (Synchronous Transport Module-4 Concatenation) of the Broadband Integrated Service Digital Network according to the ITU-T recommendation.

BACKGROUND OF THE INVENTION

In the time-division multiplexing technique, multiplexed signals in each channel are sequentially allotted to a time slot, and pulses for forming a frame synchronizing pattern are inserted into the multiplexed signals. At the transmitting side, a frame means a period for inserting the frame synchronizing pattern. At the receiving side, a frame synchronization means to discriminate a time slot location of the channel in each frame by checking a pulse train received from each frame and detecting a frame synchronizing pattern therefrom.

Upon increasing need of high-speed signal processing for data being transmitted from the broadband digital network, the capacity and the structure of the frame synchronization in the data reception are becoming important. According to the ITU-T recommendation, the STM-4C frame in the subscriber match section constructed with a Synchronous Digital Hierarchy(SDH) consists of 12; of frame alignment bytes A1 and the subsequent 12 of frame alignment bytes A2, where A1=11110110 and A2=00101000.

Reference may be made to U.S. Pat. No. 4,748,623, issued to Fujimoto, which discloses a frame synchronizing circuit for use in STM-1 structure in which a frame synchronization with respect to the multiplexed receiving data is detected utilizing parallel processing method. This technique represents a frame synchronizing circuit for comparing and controlling the timings of the frame pulses, after it is determined whether there is a frame synchronizing pattern from the converted parallel data or not.

However, this technique has a disadvantage that during the process of searching the frame synchronization by identifying the frame synchronizing pattern, a frame detector and a timing comparator is separated from each other and a timing control circuit is additionally required, which results in not only an increase in the number of clocks required for obtaining the frame synchronization, but also requiring a large amount of hardware, due to the complex process of searching the frame synchronization.

Further, the Fujimoto directs to a dedicated frame synchronizing circuit for use only in the STM-1 structure, and therefore has difficulty in being applied as it is to the STM-4C structure in which a great quantity of data to be processed is needed and the data processing at a very high speed is performed, as compared to the STM-1 structure.

Therefore, it is an object of the present invention to overcome the above disadvantages in the prior art and provide a simplified, less power consumptive frame synchronizing device in the STM-4C structure according to the ITU-T recommendation.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

A frame synchronizing device of the present invention is defined by the claims with a specific embodiment shown in the attached drawings. For the purpose of summarizing the invention, the invention relates to a frame synchronizing device for synchronizing a plurality of frames in receiving data being transmitted at a high speed from a broadband digital network, each frame including the first 12 bytes of frame alignment bytes A1 and the next 12 bytes of frame alignment bytes A2, said frame synchronizing device comprises a serial/parallel converting means for converting data inputted in serial by a reference clock CLK into parallel data S1 to S8 in the unit of bytes. A first comparison means outputs a first comparison signal X1 by determining whether the parallel data S1 to S8 converted by said serial/parallel converting means correspond to the frame alignment bytes A1. A second comparison means outputs a second comparison signal X2 by determining whether the parallel data S1 to S8 converted by said serial/parallel converting means correspond to the frame alignment bytes A2. A selection means selects one of the two comparison signals X1, X2 outputted from said first and second comparison means, depending on a predetermined selection control signal SELECT. A first delay means produces a first clock CLK1 by delaying an output of said selection means. A byte alignment means aligns the parallel data S1 to S8 outputted from said serial/parallel converting means in accordance with a frame, in response to the first clock CLK1 delayed by said first delay means. A divider means divides the reference clock CLK by 1/n to output a divided output. A second delay means produces a second clock CLK2 by delaying the divided output of said divider means by a predetermined interval. A synchronizing pattern detecting means detects whether a first frame synchronizing pattern consisting of subsequent 12 of the frame alignment bytes A1 and a second frame synchronizing pattern consisting of subsequent 12 of the frame alignment bytes A2 are received, in response to any one of the first and second comparison signals outputted from said selection means in synchronism with the second clock CLK2, thereby outputting a frame synchronous pattern detecting signal CNT. A pattern continuous identifying means outputs a frame pulse FP representing whether the first frame synchronizing pattern and, in sequence, the second frame synchronizing pattern are received, in response to the frame synchronous pattern detecting signal CNT representing detection of the first and second frame synchronous patterns in synchronism with the second clock CLK2 produced by said second delay means. A synchronizing pattern selecting means outputs a predetermined selection control signal SELECT so as to effect said selection means to select the second comparison signal X2 and output it, in response to the first frame synchronous pattern detecting signal CNT outputted from said synchronizing pattern detecting means. An initializing means initializes said synchronizing pattern detecting means in response to the frame synchronous pattern detecting signal CNT representing detection of the first and second frame synchronizing patterns. The initializing means further initializes said synchronizing pattern detecting means, said pattern continuous identifying means and said synchronizing pattern selecting means in response to the frame pulse FP outputted through said pattern continuous identifying means.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be made to the following detailed description taken in conjunction with the accompanying drawings in which.

Similar reference charters refer to similar parts throughout the several views of the drawings.

DETAILED DESCRIPTION OF THE INVENTION

Before proceeding to describe the invention, it will be appreciated that each frame of a plurality of frames in the STM-4C structure consists of 9 rows×1080 columns (=9720 bytes) as the unit of bytes. In the first 24 bytes in the first of each row in each frame, the first 12 bytes are frame alignment bytes A1 and the next 12 bytes are frame alignment bytes A2, respectively.

Figure 1:
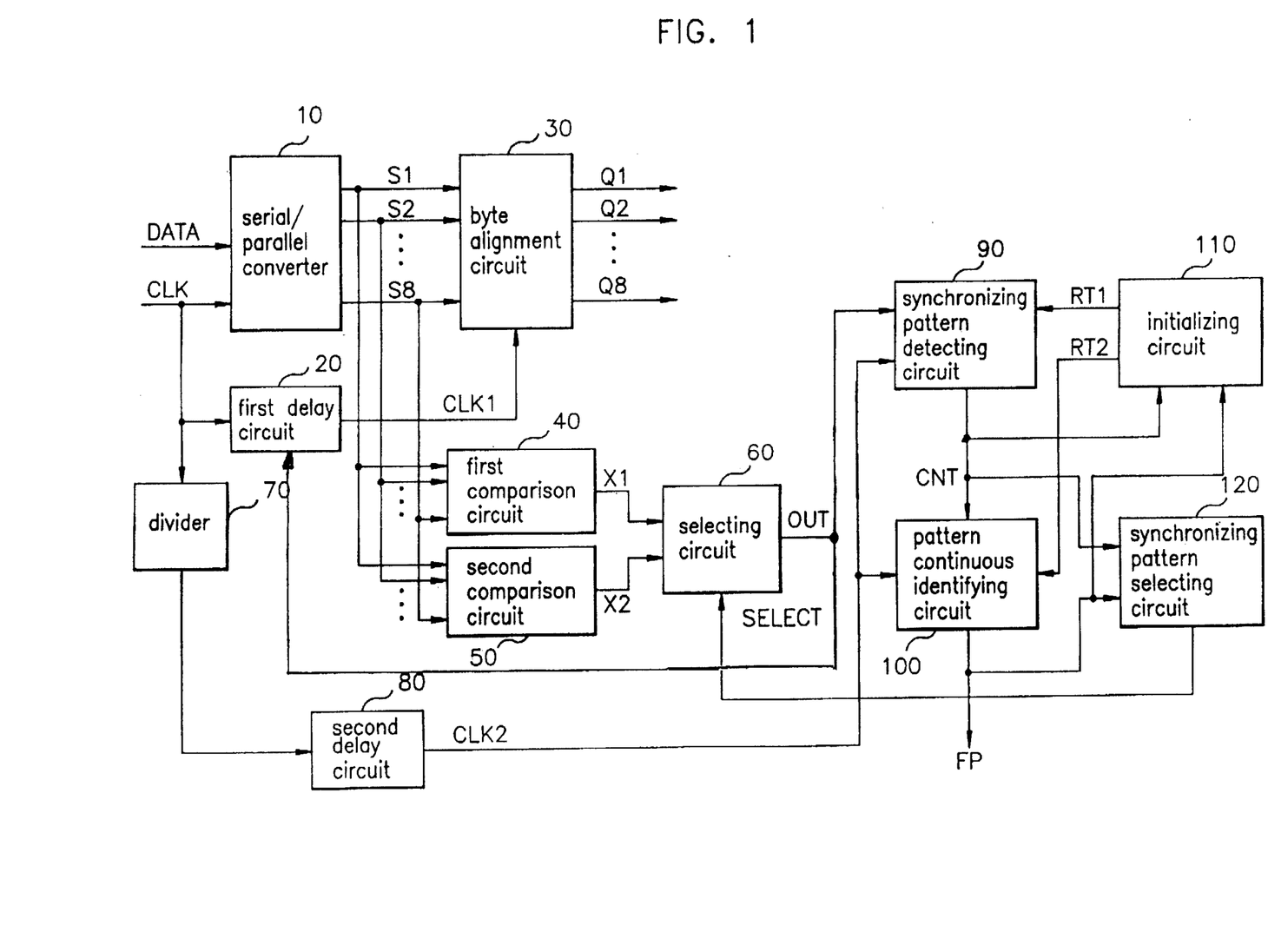
FIG. 1 illustrates a block diagram showing a structure of a frame synchronizing device according to the present invention.

Referring now to FIG. 1, it represents a structure of the frame synchronizing device according to the present invention.

In the figure, a serial/parallel converter 10 converts data DATA inputted in serial by a reference clock CLK into 1 byte(8 bits) of parallel data S1 to S8. A first delay circuit 20 delays an output signal from a selecting circuit 60 for a predetermined time interval to produce a first clock CLK1. A byte alignment circuit 30 aligns the parallel data S1 to S8 received from the serial/parallel converter 10 by the unit of bytes in accordance with the frames. A first comparison circuit 40 receives the parallel data S1 to S8 from the serial/parallel converter 10 and then determines whether or not the received signals correspond to the frame alignment bytes A1(=11110110) to thereby output a first resulting comparison signal X1. A second comparison circuit 50 also receives the parallel data S1 to 98 from the serial/parallel converter 10 and determines whether or not the received signals correspond to the frame alignment bytes A2(= 00101000) to thereby output a second resulting comparison signal X2.

A selection circuit 60 controlled by a selection control signal SELECT selects one of the two signals X1, X2 outputted from the first and second comparison circuits 40, 50 to output a selected signal. A divider 70 divides the reference clock CLK by 1/n to output a divided clock. A second delay circuit 80 delays the 1/n divided clock outputted from the divider 70 to output a second clock CLK2. A synchronizing pattern detecting circuit 90 detects if a first frame synchronizing pattern consisting of the subsequent 12 of the frame alignment bytes A1 and a second frame synchronizing pattern consisting of the subsequent 12 of the frame alignment bytes A2 are received. A pattern continuous identifying circuit 100 identifies whether or not the first frame synchronizing pattern and the second frame synchronizing pattern are received in sequence. An initializing circuit 110 effects the synchronizing pattern detecting circuit 90 to be reset, in response to a frame synchronizing pattern detecting signal CNT outputted from the synchronizing pattern detecting circuit 90 which represents that any one of the first and the second frame synchronizing patterns has detected. The initializing circuit 110 also makes the pattern detecting circuit 90 and the synchronizing pattern selection circuit 120, which will be described hereinafter, to be in the reset state, in response to the frame pulse signal outputted through the pattern continuous identifying circuit 100. At the synchronizing pattern selecting circuit 120, a predetermined selection signal SELECT is outputted for allowing the selecting circuit 60 to select the signal X2 outputted from the second comparison circuit 50 and output the same, in response to the first frame synchronizing pattern detecting signal CNT outputted from the synchronizing pattern detecting circuit 90.

The frame synchronizing device of the preferred embodiment of the present invention will now be explained with reference to the accompanying drawings.

Figure 2A:
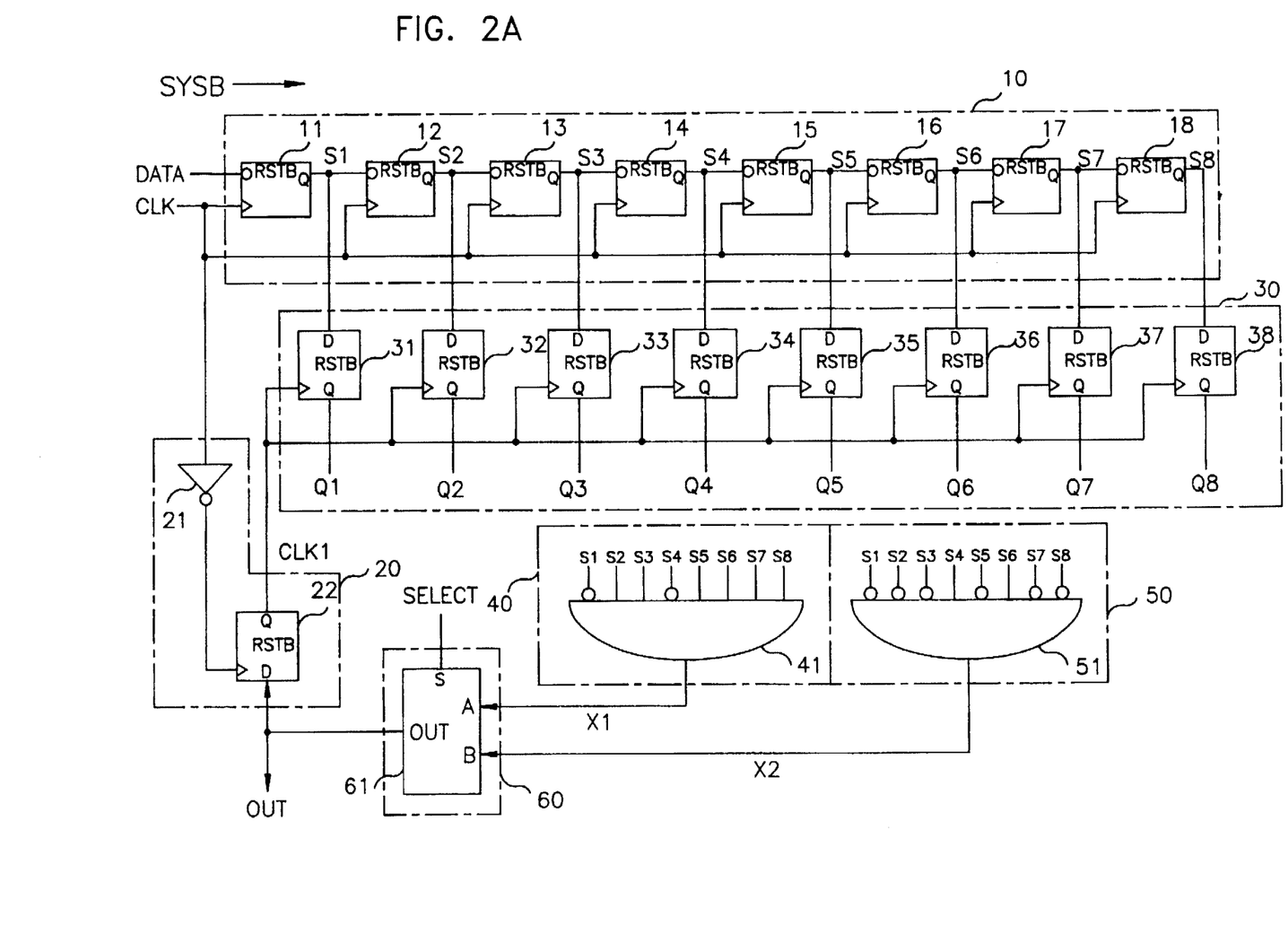
FIGS. 2A and 2B illustrate a circuit of a preferred embodiment of the present invention.
Figure 2B:
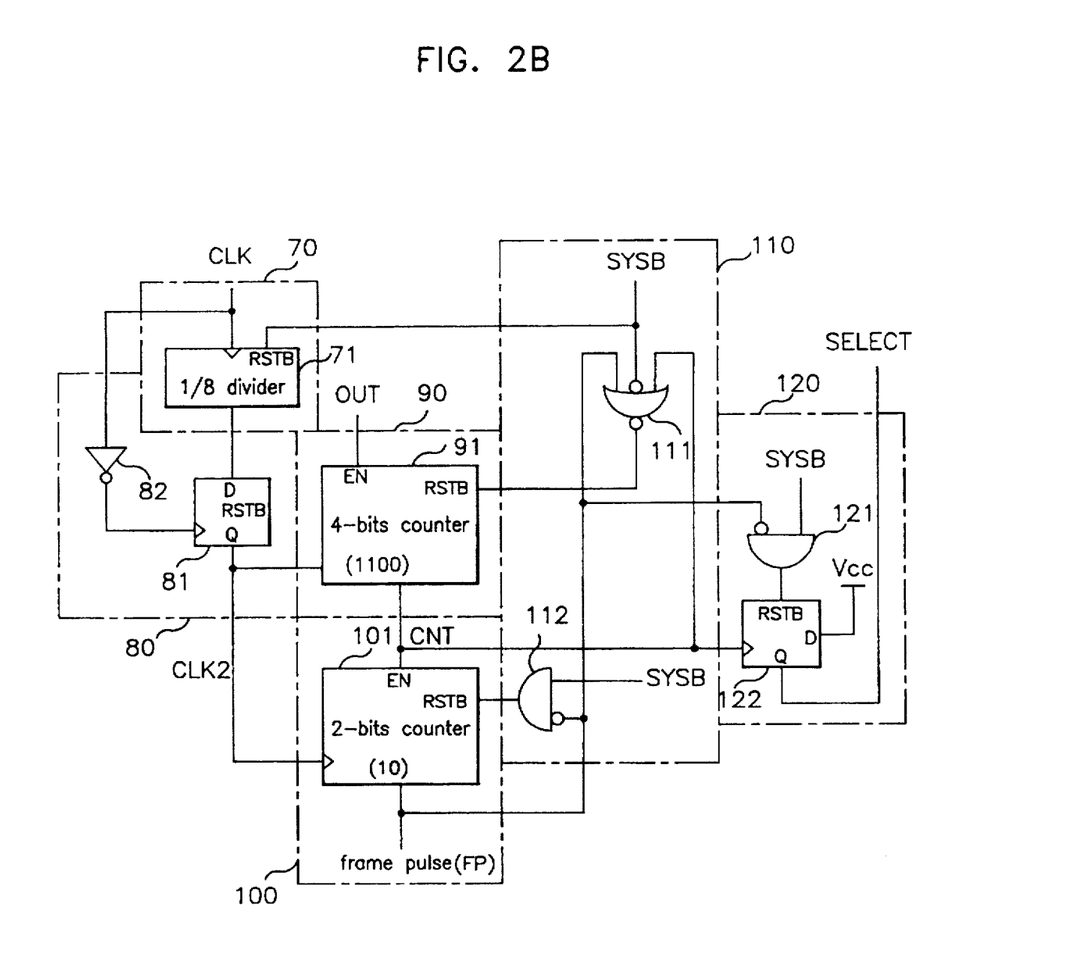

FIGS. 2A and 2B show a preferred embodiment of the present invention. In FIG. 2A, the serial/parallel converter 10 includes 8 of D flip-flops (11 to 18; hereinafter, referred to "the 1-st to the 8-th flip-flop") being enabled in synchronism with the clock(CLK; hereinafter, referred to as "reference clock"). The first delay circuit 20 is comprised of a first inverter 21 for inverting the reference clock CLK as an input to output an inverted clock and a D Flip-Flop (22; hereinafter, referred to as "the 9-th Flip-Flop") operative in response to the output of the first inverter 21 for outputting a clock(CLK1; hereinafter, referred to as "the first clock"), with the output signal of the selecting circuit 60 which delays the reference clock by ½ clock pulse interval being supplied thereto as an input. The byte alignment circuit 30 comprises 8 of D Flip-Flops (31 to 38; hereinafter, referred to as "the 10-th to the 17-th Flip-Flop") operative in synchronism with the first clock CLK1 outputted from the 9-th Flip-Flop 22, for receiving the outputs from the respective 1-st to 8-th Flip-Flop 11 to 18 as their corresponding input and outputting them.

The first comparison circuit 40 receives the outputs from the 1-st to the 8-th Flip-Flop, respectively. The first comparison circuit 40 includes an AND gate(hereinafter, referred to as "the first AND gate") for outputting the first comparison signal X1 representing whether or not the outputs S1 to S8 of the 1-st to the 8-th Flip-Flop 11 to 18 correspond to the frame alignment bytes A1(=11110110) by performing logical product of the least significant bit signal S1 plus the 4-th bit signal S4, each being inverted, and the remaining output bit signals S2, S5, S6, S7 and S8 of the parallel data S1 to S8. The second comparison circuit 50 receives the outputs S1 to S8 outputted from the serial/parallel converter 10. The second comparison circuit 50 includes an AND gate (hereinafter, referred to as "the second AND gate") for outputting the second comparison signal X2 to show whether or not the outputs S1 to S8 of the 1-st to the 8-th Flip-Flop 11 to 18 correspond to the frame alignment bytes A2(=00101000) by performing logical product of the outputs S4 and S6 and the remaining signals being inverted except for the outputs S4 and S6 of the outputs S1 to S8 outputted from the 1-st to the 8th Flip-Flop 11 to 18. The selection circuit 60 controlled by the selection control signal SELECT includes a multiplexer 61 for selecting and outputting one of the two outputs X1 and X2 from the first and second AND gates 41 and 51. The output OUT of the multiplexer 61 in the selection circuit 60 is then supplied as an input signal of the 9-th Flip-Flop 22.

Referring now to FIG. 2B, the divider circuit 70 is constructed with a ⅛ divider which receives the reference clock CLK to output the signal divided by ⅛ frequency. The second delay circuit 80 includes a second inverter 81 for allowing the inputted reference clock CLK to be inverted and a D Flip-Flop controlled by the second inverter 81(82; hereinafter, referred to as "the 18-th Flip-Flop") for outputting the clock CLK2(hereinafter, referred to as "the second clock") obtained by delaying the clock being divided through the divider 70 by ½ clock pulse interval of the reference clock CLK. The synchronizing pattern detecting circuit 90 includes a 4-bit counter 91(hereinafter, referred to as "the first counter"). The first counter 91 is enabled in response the output OUT of the selecting circuit 60 representing the state that the inputted data corresponds to the frame alignment bytes A1 or the frame alignment bytes A2, is operative in synchronism with the second clock CLK2 outputted from the 18-th Flip-Flop 82, and outputs a logical "1" (or, a high level) of signal CNT when the count value becomes 12 by increasing the count by 1. The pattern continuous identifying circuit 100 includes a 2-bit counter 101(hereinafter, referred to as "the second counter"). The second counter 101 is then enabled in response to the output CNT of the first counter 91 which is a logical "1", is operative in synchronism with the second clock CLK2 from the 18-th Flip-Flop, and outputs a frame pulse FP at a logical "1" when the count value becomes 2 by increasing the count by 1.

When the device of the embodiment as discussed above is powered-on, a logical "0" (or, a low level) of a reset signal SYSB is applied to each reset terminal RSTB in the Flip-Flops 11 to 18, 22, 31 to 38, and 82 and the divider circuit 70, which causes all of them to be in the reset state.

The initializing circuit 110 includes a NOR gate 111 for supplying to the reset terminal in the first counter 91 the logical signal obtained by performing logical operation of the inverted signal of the reset signal SYSB and the output signals CNT and FP from the first and second counters 91 and 101, and an AND gate 112(hereinafter, referred to as "the third And gate") for supplying to the reset terminal in the second counter 101 the logical signal obtained by performing logical product of the reset signal SYSB and the output signal FP from the second counter 101. The synchronizing pattern selecting circuit 120 is constituted with an AND gate 121(hereinafter, referred to as "the fourth AND gate) for receiving the inverted signal of the output pulse FP from the second counter 101 and the reset signal SYSB to perform logical operation, and a D Flip-Flop 122 (hereinafter, referred to as "the 19-th Flip-Flop") for outputting a logical "1" of the selecting control signal SELECT by receiving at the reset terminal STB therein the output of the fourth AND gate 121 and being it synchronized with the output CNT from the first counter 91.

When the device is powered-on, the output from the NOR gate 111 and the output from the third AND gate 112 will be held at a logical "0", respectively, such that both of the first and second counters 91 and 101 as well as the Flip-Flop as discussed above become to be in the reset state.

The operation of the embodiment of the present invention as discussed above will now be described in detail.

Referring now back to FIG. 2A, if the device is powered-on, a logical "0" of the reset signal SYSB is provided to each the reset terminal RSTB in the Flip-Flop 11 to 18, 22, 31 to 38 and 82, and the divider 70, which allows all of them to be in the reset state. Since the outputs of the NOR gate 111 and the third AND gate 112 are also a logical "0", the first and second counters 91 and 101 become to be in the reset state. After a predetermined time is lapsed, the reset signal SYSB will then be held at a logical "1".

The serial data DATA being synchronized by the unit of bit is shifted by 1-bit every clock by means of the 1-st to 8-th Flip-Flops 11 to 18 which are operative in response to the input of the reference clock CLK, and is then converted into 8 bits of the parallel data S1 to S8. The converted data S1 to S8 outputted from the 1-st to the 8-th Flip-Flop 11 to 18 are then in synchronism with the first clock CLK1 outputted from the first delay circuit 20, and are provided to the first AND gate 41 and the second AND gate 51, respectively. The first and second AND gates 41, 51 then compare the outputs S1 to S8 of the 1-st to the 8-th Flip-Flop 11 to 18 with the frame alignment bytes A1(=11110110) and the frame alignment bytes A2(=00101000), respectively. At the time, if the outputs S1 to S8 of the 1-st to the 8-th Flip-Flop are the frame alignment bytes A1(=11110110), the first AND gate 41 outputs a logical "1" of the comparison signal X1, and the second AND gate 51 outputs a logical "0" of the comparison signal X2, respectively. On the contrary, if the outputs S1 to S8 therefrom are the frame alignment bytes A2(=00101000), the first AND gate 41 outputs a logical "0" of the comparison signal X1, and the second AND gate 51 outputs a logical "1" of the comparison signal X2, respectively. In addition, the outputs S1 to S8 therefrom do not pertain to the frame alignment bytes A1 and A2. Both the first and second AND gates output a logical "0" of the comparison signals X1, X2, respectively. The outputs X1, X2 of the first and second AND gates 41, 51 are provided to both input terminals A, B of a Multiplexer 61, respectively. The multiplexer 61 selects any one of the outputs X1, X2 from the first and second AND gates 41, 51 depending on a logical level of the selecting control signal SELECT supplied from the 19-th Flip-Flop 122 in the synchronizing pattern selecting circuit 120 to output it as an output thereof. At the time, if the output OUT of the multiplexer 61 is a logical "1", the first delay circuit 20 supplies the first clock CLK1 to the byte alignment circuit 30 to allow the parallel data S1 to S8 outputted from the serial/parallel converting circuit 10 to be possibly outputted. In addition, if the output OUT of the multiplexer 61 is a logical "1", it allows the first counter 91 to be in the enable state EN, so that the count operation is performed depending on the second clock CLK2 supplied from the second delay circuit 80. However, if the output OUT of the multiplexer 61 is a logical "0", the output of the first delay circuit 20 becomes a logical "1", so that the output value of the byte alignment circuit 30 will be maintained at the previous value.

Figure 3:
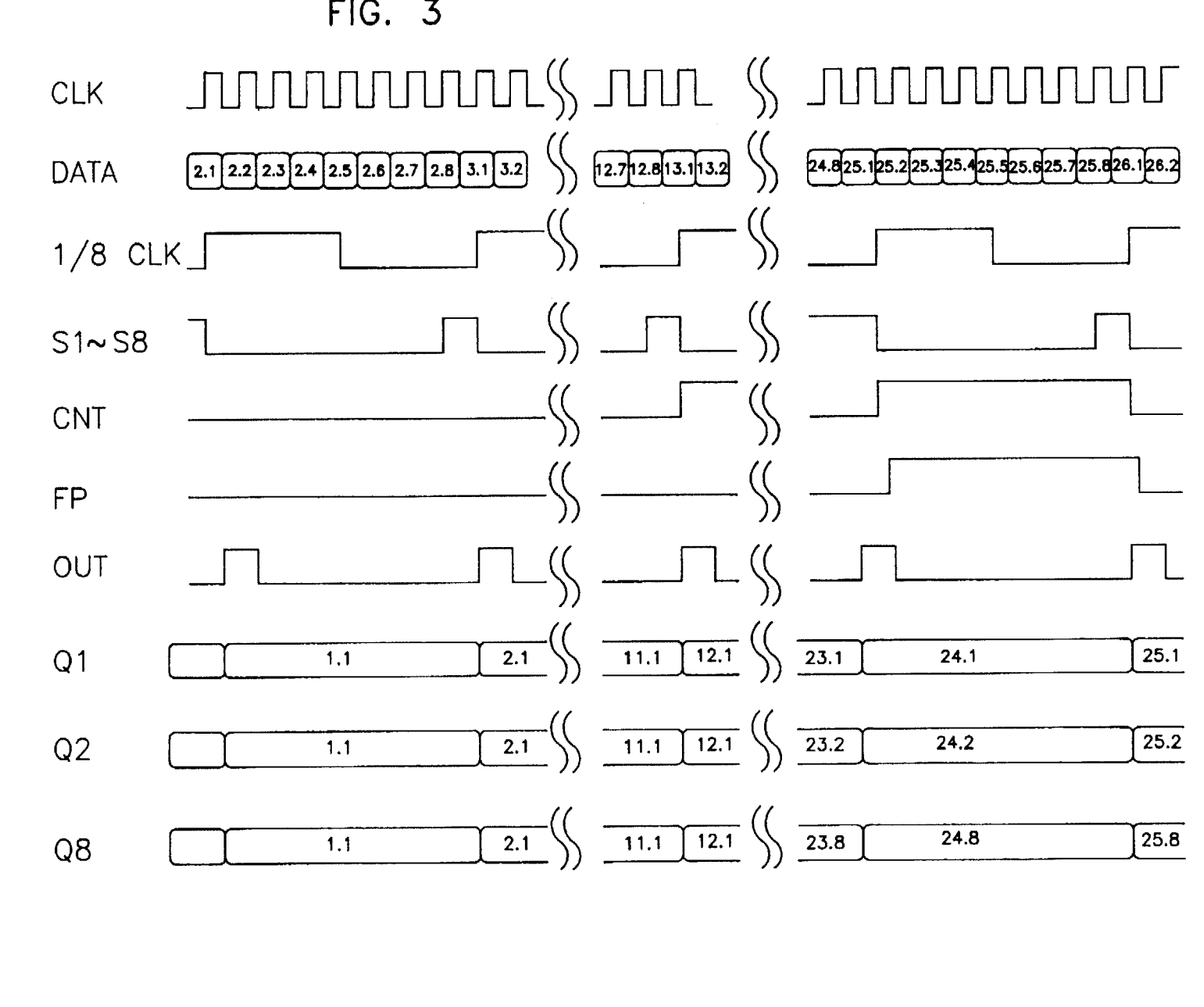
FIG. 3 illustrates a timing diagram of a frame synchronizing device according to the present invention.

For fuller understanding of the nature of this embodiment of the invention, the reference will be made to the following description taken in conjunction with the timing diagram in FIG. 3 and by way of the example where the byte signals of the overhead interval in the normal frames is inputted as a data signal DATA.

As the data signal DATA, when the first frame alignment bytes(A1=11110110) in a certain frame at the overhead interval are inputted in serial, the input data signal (see, DATA in FIG. 3) is converted into the 8-bits of the parallel data S1 to S8 by the serial/parallel converting circuit 10 depending on the input of the reference clock (see, CLK in FIG. 3) and is then supplied to the first and second comparison circuits 40, 50, respectively. The first comparison circuit 40 discriminates that the parallel data S1 to S8 correspond to the first frame alignment bytes A1 and then outputs a logical "1" of the first comparison signal X1 to represent the result, whereas the second comparison circuit 50 discriminates that the parallel data S1 to S8 do not correspond to the first frame alignment bytes A2 and then outputs the second comparison signal X2 to represent the result. At the time, since the reset signal SYSB is a logical "1" and the second counter 101 is not in the reset state, the output of the fourth AND gate 121 will be held at a logical "1", which causes the 19-th Flip-Flop 122 to be maintained out of the reset state. Since the selecting control signal SELECT of the synchronizing pattern selecting circuit 120 is a logical "0", the selecting circuit 60 selects the output X1 of the first comparison circuit 40 to output it as an output signal OUT thereof. That is, the selecting circuit 60 supplies a logical "1" of the output signal OUT to an input terminal D of the 18-th Flip-Flop 22 in the first delay circuit 20 and an enable terminal EN of the first counter 91, respectively. As a result, the byte alignment circuit 30 receives and outputs the output of the serial/parallel converting circuit 10 depending on the input of the first clock CLK1 outputted from the first delay circuit 20, and the first counter 91 increases the count value by 1 depending on the input of the second clock CLK2. The outputs (see, Q1 Q8 in FIG. 3) of the byte alignment circuit 30 are then transferred to a controller for detecting frame byte errors in order to detect errors contained in the frame byte. The first counter 91 is then divided by the ⅛ divider 71 when the count value thereof is 12, and outputs a logical "1" of the frame synchronizing pattern detecting signal (see, CNT in FIG. 3) for one period of the second clock CLK2 by the rising edge of the second clock CLK2 delayed by the inverted reference CLK. The frame synchronizing pattern detecting signal CNT at a logical "1" outputted as described above is gate-delayed by means of NOR gate 111, which causes the first counter 91 to be reset in the next cycle of the second clock CLK2, so that the output CNT of the first counter 91 becomes a logical "0". As a result of the above, even though the second clock CLK2 is inputted therein, the second counter 101 outputs a logical "0" of the frame pulse (see, FP in FIG. 3).

In case that subsequent to the first frame alignment bytes A1 being inputted, the second frame alignment bytes A1 are inputted in sequence, the description therefor is the same as in the above description with respect to the input of the first frame alignment bytes A1, except that the first counter 91 has 2 in count value.

As discussed above, when the sequential inputting process for 12 of the first frame alignment bytes A1 is completed, the first counter 91 outputs a logical "1" to supply it to the pattern continuous identifying circuit 100, the initializing circuit 110 and the synchronizing pattern selecting circuit 120, respectively. Accordingly, the second counter 101 in the pattern continuous identifying circuit 100 is enabled to thereby increase its count value by 1 depending on the second clock CLK2 outputted from the second delay circuit 80.

In the meantime, if the first counter 91 outputs a logical "1" of the frame pattern detecting signal CNT by completing the sequential inputting process for the 12 of the first frame alignment bytes A1, the 19-th Flip-Flop 122, which has been maintained out of the reset state, outputs the selection control signal SELECT to supply it to the selecting circuit 60. Thus, the selecting circuit 60 selects the output X2 of the second comparison circuit 51 to output it as an output signal OUT thereof.

If it is determined that subsequent to the 12 of the first frame alignment bytes A1 being inputted, the 1 byte signal being inputted in sequence corresponds to the frame alignment bytes A2(=00101000), the output X2 of the second comparison circuit 50 becomes a logical "1" and therefore the output OUT from the selection circuit 60 will be also held at a logical "1". Consequently, the byte alignment circuit 30 receives the outputs S1-S8 of the serial/parallel converter 10 and allows the first counter 91 to be enabled, to thereby increase the count value thereof in response to the second clock CLK2 inputted from the second delay circuit 80. At the time, since the second clock CLK2 is provided to the second counter 101, but the output from the first counter 91 is a logical "0", the count operation of the second counter 101 being disabled can not be performed. Thus, the second counter 101 will have no change in maintaining the count value 1 obtained by the input of the 12 of the frame alignment bytes A1. Of course, the outputs CNT, FP from the first and second counters 91, 101 are a logical "0", respectively.

Further, in case that subsequent to the first frame alignment bytes A2 being inputted, the second frame alignment bytes A2 are inputted in sequence, the description therefor is the same as in the above description with respect to the input of the first frame alignment bytes A2, except that the first counter 91 has 2 in count value.

By performing the operation as described above, the sequential inputting process for the 12 of the frame alignment bytes A2 is completed, the first counter 91 outputs a logical "1" to provide it to the pattern continuous identifying circuit 100, the initializing circuit 110 and the synchronizing pattern selecting circuit 120, respectively. Consequently, the second counter 101 in the pattern continuous identifying circuit 100 is then enabled, so that it has the count value 2 by increasing its counter value by 1 depending upon the second clock CLK2 outputted from the second delay circuit 80, thereby outputting a logical "1" of the frame pulse FP. The second counter 101 is devided into 8 by the ⅛ divider 71 when the count value thereof is 2, and outputs a logical "1" of the output signal (see, FP in FIG. 3) for one period of the second clock CLK2 by the rising edge delayed by the inverted reference clock. The frame pulse FP at a logical "1" being outputted as described above is gate delayed through the AND gate 112 so that the second counter 101 outputs a logical "0" of the frame pulse FP by resetting the second counter 101 in the cycle next to the second clock CLK2. In addition, the frame pulse FP is gate delayed through the NOR gate 111, causing the first counter P1 to be reset in the cycle next to the second CLK2. Thus, the first counter 91 outputs a logical "0" of the frame pulse FP. At the time, since the reset signal is a logical "1", the output from the fourth AND gate 121 will be held at a logical "0". Accordingly, the state of 19-th Flip-Flop 122 is changed into a reset state by the logical "0" state outputted from the fourth AND state 121 so that it outputs a logical "0" of the selection control signal SELECT.

In contrast to the case as discussed above, when 2 bytes of data is sequentially inputted, the first and second comparison circuits 40, 50 output a logical "0" of the comparison signals X1, X2, if the first 1 byte data is, for example, the frame alignment bytes A1 (or, A2) and the second 1 byte data do not correspond to the frame alignment byte A1 (or A2). Thus, it can be seen that as the output OUT of the selection circuit 60 is held at a logical "0", the states of the counters 91, 101 will not be changed into the enable state, so that the count operation thereof can not be performed. In other word, the outputs of the counters 91, 101 will be held at a logical "0", as it is.

As described above, according to the present invention described with reference to the preferred embodiment as discussed above in detail, the frame synchronization can easily be searched by simplified device structure at a lower clock speed and the above frame alignment bytes A1, A2 can also be detected by means of the same structure as mentioned above, so that the reduction in the amount of hardware and less power consumption is achieved, whereby a superior economical effects in performance can be accomplished.

Although the present invention and its advantages have been described in detail, it should be understood that various changes, substitutions and alterations can be made herein without departing from the spirit and scope of the invention as defined by the appended claims.

What is claimed is:

1. A frame synchronizing device for synchronizing a plurality of frames in receiving data being transmitted at a high speed from a broadband digital network, each frame including the first 12 bytes of frame alignment bytes A1 and next 12 bytes of frame alignment bytes A2, said frame synchronizing device comprises:

a serial/parallel converting means for converting data inputted in serial by a reference clock CLK into parallel data S1 to S8 in the unit of bytes;

a first comparison means for outputting a first comparison signal X1 by determining whether the parallel data S1 to S8 converted by said serial/parallel converting means correspond to the frame alignment bytes A1;

a second comparison means for outputting a second comparison signals X2 by determining whether the parallel data S1 to S8 converted by said serial/parallel converter correspond to the frame alignment bytes A2;

a selection means for selecting one of the two comparison signals X1, X2 outputted from said first and second comparison means, depending on a predetermined selection control signal SELECT;

a first delay means for producing a first clock CLK1 by delaying an output of said selection means;

a byte alignment means for aligning the parallel data S1 to S8 outputted from said serial/parallel converting means in accordance with a frame, in response to the first clock CLK1 delayed by said first delay means;

a divider means for dividing the reference clock CLK by 1/n to output a divided output;

a second delay means for producing a second clock CLK2 by delaying the divided output of said divider means by a predetermined interval;

a synchronizing pattern detecting means for detecting whether a first frame synchronizing pattern consisting of subsequent 12 of the frame alignment bytes A1 and a second frame synchronizing pattern consisting of subsequent 12 of the frame alignment bytes A2 are received, in response to any one of the first and second comparison signals outputted from said selection means in synchronism with the second clock CLK2, thereby outputting a frame synchronous pattern detecting signal CNT;

a pattern continuous identifying means for outputting a frame pulse FP representing whether the first frame synchronizing pattern and, in sequence, the second frame synchronizing pattern are received, in response to the frame synchronous pattern detecting signal CNT representing detection of the first and second frame synchronous patterns in synchronism with the second clock CLK2 produced by said second delay means;

a synchronizing pattern selecting means for outputting a predetermined selection control signal SELECT so as to effect said selection means to select the second comparison signal X2 and output it, in response to the first frame synchronous pattern detecting signal CNT outputted from said synchronizing pattern detecting means; and an initializing means for initializing said synchronizing pattern detecting means in response to the frame synchronous pattern detecting signal CNT representing detection of the first and second frame synchronizing patterns, and further initializing said synchronizing pattern detecting means, said pattern continuous identifying means and said synchronizing pattern selecting means in response to the frame pulse FP outputted through said pattern continuous identifying means.

2. A frame synchronizing device of claim 1 wherein said first delay means includes:

a first inverter for inverting the reference clock CLK as an input to output an inverted output; and a 9-th Flip-Flop operative by the output of said first inverter for outputting the first clock CLK1, with the output of said selecting means delayed by ½ clock pulse interval of the reference clock CLK being inputted as an input thereof.

3. A frame synchronizing device of claim 2 wherein said 9-th Flip-Flop is a D Flip-Flop.

4. A frame synchronizing device of claim 1 wherein said first comparison means includes a first AND gate for performing logical product to determine whether the parallel data S1 to S8 outputted from said serial/parallel converting means correspond to the frame alignment bytes A1.

5. A frame synchronizing device of claim 4 wherein said first AND gate is to perform logical product of the least significant bit signal and 19-th bit signals S1, S4, each being inverted, and the remaining output bit signals S2, S3, S5, S6, S7 and S8 of the parallel data S1 to S8 outputted from said serial/parallel converting means.

6. A frame synchronizing device of claim 1 wherein said second comparison means includes a second AND gate for performing logical product to determine whether the parallel data S1 to S8 outputted from said serial/parallel converting means correspond to the frame alignment bytes A2.

7. A frame synchronizing device of claim 6 wherein said first AND gate is to performing logically product of the 4-th and 6-th bit signals S4, S6 and the remaining output bit signals, each being inverted, of the parallel data S1 to S8 outputted from said serial/parallel converting means.

8. A frame synchronizing device of claim 1 wherein said second delay means includes a second inverter for inverting the reference clock CLK to output an inverted reference clock; and a 18-th Flip-Flop operative by the inverted reference clock by delaying the divided clock being divided through said divider means by ½ clock pulse interval of the reference clock CLK.

9. A frame synchronizing device of claim 8 wherein said 18-th Flip-Flop is a D Flip-Flop.

10. A frame synchronizing device of claim 1 wherein said selection means includes a Multiplexer.

11. A frame synchronizing device of claim 1 wherein said synchronizing pattern detecting means includes a counter which is enabled in response to the output OUT of said selection means representing the state that the parallel data inputted corresponds to the A1 frame alignment bytes and A2 frame alignment bytes, is operative in synchronism with the second clock CLK2, and outputs a predetermined level of the frame synchronizing pattern detecting signal CNT when a count value becomes 12 by increasing the count by 1.

12. A frame synchronizing device of claim 11 wherein said first counter is a 4-bits counter.

13. A frame synchronizing device of claim 1 wherein said pattern continuous identifying means includes a second counter which is enabled in response to a predetermined level of the frame synchronizing pattern detecting signal CNT outputted from said synchronizing pattern detecting means, is operative in synchronism with the second clock CLK, and outputs a predetermined level of the frame pulse FP when a counter value becomes 2 by increasing the count by 1.

14. A frame synchronizing device of claim 13 wherein said second counter is a 2-bits counter.

15. A frame synchronizing device of claim 1 wherein said initializing means includes a NOR gate for performing logical operation of an inverted signal of the reset signal SYSB, the frame synchronizing pattern detecting signal CNT and the frame pulse FP to reset said pattern continuous identifying means; and an AND gate for performing logical product of the reset signal SYSB and an inverted signal of the frame pulse FP to reset said pattern continuous identifying means.

16. A frame synchronizing device of claim 15 wherein said initializing means resets said synchronizing pattern detecting means and said pattern continuous identifying means for one period of the second clock CLK2 being divided by said divider means.

17. A frame synchronizing device of claim 1 wherein said synchronizing pattern selecting means includes a fourth AND gate for performing logical product of an inverted signal of the frame pulse FP and the reset signal SYSB; and a 19-th Flip-Flop for receiving the output of said fourth AND gate at a reset terminal RSTB thereof and outputting a predetermined level of the selection control signal SELECT in synchronism with the frame synchronous pattern detecting signal CNT.

18. A frame synchronizing device of claim 17 wherein said 1-th Flip-Flop is a D Flip-Flop.

* * * * *